US010399275B2

(12) United States Patent
Nielsen et al.

(10) Patent No.: US 10,399,275 B2
(45) Date of Patent: Sep. 3, 2019

(54) SYSTEM AND METHOD OF MANUFACTURING A WIND TURBINE BLADE (71) Applicant: LM WP PATENT HOLDING A/S, Kolding (DK)

(72) Inventors: Lars Nielsen, Skanderborg (DK); Jesper Hasselbalch Garm, Kolding (DK)

(73) Assignee: LM WP PATENT HOLDING A/S, Kolding (DK)

( * ) Notice: Subject to any disclaimer, the term of this patent is extended or adjusted under 35 U.S.C. 154(b) by 222 days.

(21) Appl. No.: 15/307,253

(22) PCT Filed: Apr. 29, 2015

(86) PCT No.: PCT/EP2015/059340
§ 371 (c)(1),
(2) Date: Oct. 27, 2016

(87) PCT Pub. No.: WO2015/165967
PCT Pub. Date: Nov. 5, 2015

(65) Prior Publication Data
US 2017/0050372 A1 Feb. 23, 2017

(30) Foreign Application Priority Data
May 1, 2014 (EP) .................... 14166776

(51) Int. Cl.
*B29C 65/78* (2006.01)
*B29C 65/48* (2006.01)
(Continued)

(52) U.S. Cl.
CPC .......... *B29C 65/7826* (2013.01); *B29C 65/48* (2013.01); *B29C 66/1122* (2013.01);
(Continued)

(58) Field of Classification Search
CPC ............ B29C 65/7823; B29C 65/7826; B29L 2031/085; F03D 1/0675; Y02E 10/721; Y02P 70/523
See application file for complete search history.

(56) References Cited

U.S. PATENT DOCUMENTS 5,470,416 A   11/1995   Herring, Jr.
2007/0036659 A1*  2/2007  Hibbard ............... B29C 63/22
                                                        416/233
2010/0143722 A1   6/2010   Anderson

FOREIGN PATENT DOCUMENTS

ES         2393865 A1 * 12/2012 ........... B29C 66/721
WO    2004/076852 A2    9/2004
(Continued)

OTHER PUBLICATIONS

International Search Report dated Sep. 21, 2015 issued in corresponding International Application No. PCT/EP2015/059340.

*Primary Examiner* — Carson Gross
(74) *Attorney, Agent, or Firm* — Nath, Goldberg & Meyer; Jerald L. Meyer; Tanya E. Harkins (57) ABSTRACT A system and method for manufacturing at least a portion of a wind turbine blade is described. The invention relates to a method for ensuring a minimum bond line height between wind turbine blade components, through the use of adhesive spacer elements. The adhesive spacer elements are positioned between the blade components prior to bonding, and act to define a buffer or space between the bonding surfaces of the respective blade components, such that the adhesive bond line height between components can be effectively guaranteed without the need for accurate alignment and positioning techniques.

12 Claims, 8 Drawing Sheets (51) Int. Cl.
*B29C 65/00* (2006.01)
*F03D 1/06* (2006.01)
*B29L 31/00* (2006.01)
*B29L 31/08* (2006.01)

(52) U.S. Cl.
CPC .... *B29C 66/12441* (2013.01); *B29C 66/1312* (2013.01); *B29C 66/301* (2013.01); *B29C 66/474* (2013.01); *B29C 66/524* (2013.01); *B29C 66/54* (2013.01); *B29C 66/61* (2013.01); *B29C 66/721* (2013.01); *F03D 1/0675* (2013.01); *B29C 65/483* (2013.01); *B29C 66/7212* (2013.01); *B29L 2031/003* (2013.01); *B29L 2031/085* (2013.01); *Y02E 10/721* (2013.01); *Y02P 70/523* (2015.11)

(56) References Cited

FOREIGN PATENT DOCUMENTS

WO 2012/172132 A1 12/2012
WO WO-2012172132 A1 * 12/2012 ........... B29C 66/721

* cited by examiner

SYSTEM AND METHOD OF MANUFACTURING A WIND TURBINE BLADE

This is a National Phase Application filed under 35 U.S.C. 371 as a national stage of PCT/EP2015/059340, filed Apr. 29, 2015, an application claiming the benefit of European Application No. 14166776.6, filed May 1, 2014, the content of each of which is hereby incorporated by reference in its entirety.

FIELD OF THE INVENTION

The present invention relates to a method for the manufacture of at least a part of a wind turbine blade, in particular parts of a wind turbine blade having adhesive bond lines between blade components, and apparatus associated with said method.

BACKGROUND OF THE INVENTION

Wind turbine blades are generally manufactured in the form of numerous separate components which are adhesively bonded together to form the greater wind turbine blade structure. Accordingly, a large part of the strength of the wind turbine blade is dependent on the structural integrity of the adhesive bond lines between the different components. A single bondline failure between blade components can result in a complete failure of the blade structure, requiring costly repair and/or replacement operations.

As the strength of an adhesive bond line is related to the height of the bond line between component surfaces, great care is taken to ensure that a minimum bond line height is maintained between component surfaces during bonding.

For example, in the case of a bondline between blade shell surfaces, this can require accurate positioning and measurement of bondline heights for the duration of a shell closing operation.

In the case of blade components which are bonded in a male-female connection, where the adhesive bond line extends along the male-female interface between components, accurate positioning of the male component relative to the female component must be performed, to ensure that the bondline height is maintained around the entire interface between components.

Figure 5A:
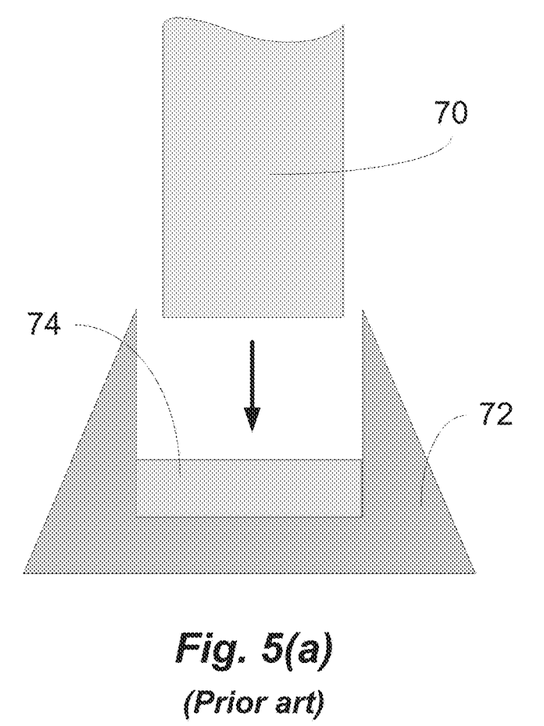
FIG. 5 illustrates a prior art assembly of a pair of wind turbine blade components.
Figure 5B:
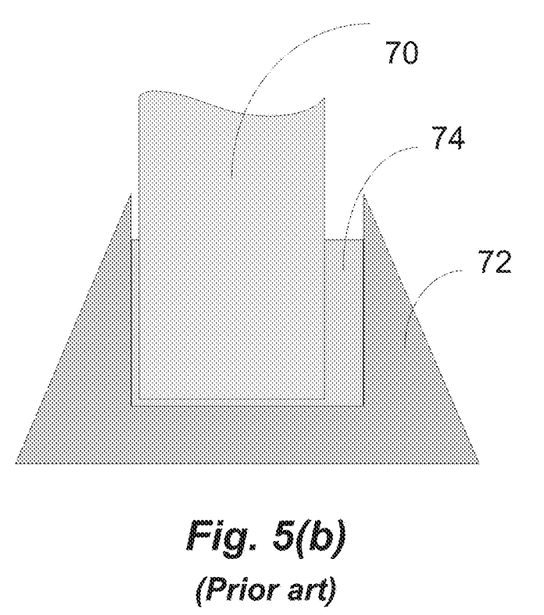

For example, with reference to FIG. 5(a), a male component in the form of a shear web body 70 is partly received within a female component in the form of a web foot 72 for a shear web, an adhesive 74 provided in the female component 72 to bond the shear web body 70 to the web foot 72. After insertion of the shear web body 70 into the web foot 72, unless the positioning and placement of the shear web body 70 is portion of the web foot 72, FIG. 5(b). In this case, the bondline of adhesive 74 between the shear web body 70 and the web foot 72 is not of equal height around the entire interface between the components, resulting in a bond of reduced strength along at least one side of the interface, increasing the risk of bond failure.

Accordingly, such bonding operations impose relatively strict accuracy requirements, and can often require over-dimensioning of component properties, e.g. minimum bondline height, to account for any margin of error or accuracy variations during the positioning process.

It is an object of the invention to provide a system and method for the bonding of wind turbine blade components which addresses the above issues.

SUMMARY OF THE INVENTION

Accordingly, there is provided a method for manufacturing at least a portion of a wind turbine blade, the method comprising the steps of:
providing a first blade component;
providing a second blade component; and
bonding said first component to said second component via an adhesive bond line applied between a bonding surface of said first component and a bonding surface of said second component,
wherein the method comprises the step of, prior to said bonding, arranging at least one adhesive spacer element between the respective bonding surfaces of said first and second components, said at least one adhesive spacer element integrated with the adhesive bond line after said bonding, wherein said at least one adhesive spacer element ensures a minimum height of the adhesive bond line is maintained between the respective bonding surfaces of said first and second components.

The use of at least one spacer element allows for the height of the adhesive bond line between components to be accurately set, as the respective bonding surfaces of the first and second components can be pushed together until the spacer prevents any further relative movement between the surfaces. The spacer element bears against the opposing bonding surfaces, and preferably the spacer element is selected such that it will not significantly deform under pressure applied between the bonding surfaces, to define a set height between the bonding surfaces after the surfaces are pressed together. Accordingly, applying an adhesive or resin between the respective bonding surfaces forms an adhesive bond line having a minimum height as defined by the at least one spacer.

Allowing for an accurate bond line height provides for increased certainty during wind turbine blade manufacture, as the strength of the bond line can be accurately predicted. In addition, the quantity of adhesive used in the blade manufacture can be precisely controlled, as the exact quantity of adhesive required to provide an adhesive bond line having a sufficient bond line height can be predicted from the outset.

In one aspect, the at least one adhesive spacer element is arranged between the respective bonding surfaces prior to the application of adhesive in an adhesive bond line between the surfaces.

In an alternative aspect, the at least one adhesive spacer element is arranged between the respective bonding surfaces after the application of adhesive in an adhesive bond line between the surfaces.

In one preferred embodiment, the at least one adhesive spacer element is arranged at least partially on top of an adhesive layer applied to at least one of the respective bonding surfaces of said first and second components. Preferably, the step of bonding comprises pressing the bonding surfaces together, wherein said at least one adhesive spacer element is pressed into the said adhesive layer by said pressing.

Depending on the application, it can provide a process advantage to locate the spacers between the components before adhesive application, e.g. if adhesive is to be injected between bonding surfaces. Alternatively, if adhesive is applied to at least one of the bonding surfaces before the bonding surfaces are brought together, the spacers may be positioned on top of or in the layer of adhesive after the adhesive application—this ensures that the locations of the spacers are not disturbed by the action of applying the adhesive.

Preferably, the at least one spacer element is selected to be of a size and/or material which does not compromise the integrity of the adhesive bond between the blade components, when the spacer element is integrated with the adhesive bond line. Preferably, the at least one spacer element is formed from a plastics material. Preferably, the at least one spacer element is formed from a ductile plastic suitable for bonding with adhesive, preferably a vinyl-ester-type adhesive.

There is further provided a method for manufacturing at least a portion of a wind turbine blade, the method comprising the steps of:

providing a first blade component;
providing a second blade component, wherein a portion of said first blade component is received within a portion of said second blade component; and
bonding said first blade component to said second blade component via an adhesive bond line applied between a bonding surface of said first component and a bonding surface of said second component,
wherein the method comprises the step of, prior to said bonding, arranging at least one adhesive spacer element between the respective bonding surfaces of said first and second components, said at least one adhesive spacer element integrated with the adhesive bond line after said bonding, wherein said at least one adhesive spacer element ensures a minimum height of the adhesive bond line is maintained between the respective bonding surfaces of said first and second components.

The use of an adhesive spacer element allows for a minimum bond height to be maintained about the male-female interface between the blade components.

Preferably, said at least one adhesive spacer is arranged such that the minimum height of the adhesive bond line is ensured for substantially the entire portion of said first blade component received in said second blade component.

Preferably, the minimum height is selected to be between 1-15 mm, further preferably between 1-5 mm.

The use of a spacer element to preserve the adhesive bond height around the periphery of the inserted portion of the first component ensures that the adhesive bond strength between the first and second components is preserved in all directions.

Preferably, said at least one adhesive spacer comprises a spacer clip adapted to be fitted over said portion of said first blade component received within said second blade component.

Preferably, said spacer clip is provided as a substantially u-shaped element.

Preferably, said spacer clip is formed from a resilient material, which allows for a degree of deformation of said spacer clip.

Providing a resilient spacer clip provides tolerance for minor adjustments or relative movements between the blade components, e.g. during the manufacturing stage when components may need to be re-positioned or the angle between components may be varied. Preferably, the spacer element acts as a spring element between the blade components.

Additionally or alternatively, said at least one adhesive spacer acts to compensate for varying relative alignment between said first and second blade components, to ensure said minimum bond line height between said components.

In one aspect, the at least one adhesive spacer acts to deform or widen a female channel of a blade component based on the relative angular orientation of a male portion of a blade component.

Preferably, said at least one adhesive spacer comprises an extending member having a substantially wave-shaped cross-sectional profile.

The spacer may be provided having an undulating or corrugated profile, to provide a plurality of points of contact between said first and second components. By providing a wave-shaped or undulating element, the spacer element can form several spaced points of contact with the opposed bonding surfaces of the components. Such a profile furthermore allows for uncured adhesive or resin to relatively easily flow around the spacer element itself, and prevents the formation of relatively large areas of one or more of the bonding surfaces having little or no direct contact with adhesive.

Preferably, the method comprises arranging an array of adhesive spacers spaced along the length of the respective bonding surfaces of said first and second components.

Preferably, said array of adhesive spacers are spaced approximately 0.5-1 m apart, along the length of the respective bonding surfaces of said first and second components.

In a preferred aspect, said first blade component is provided as a sandwich panel or shear web body, and said second blade component is provided as a web foot flange arranged to receive an end of said sandwich panel or shear web body.

Preferably, said at least one adhesive spacer comprises a spacer clip adapted to be fitted over an end of said sandwich panel or shear web body.

In one aspect, the method comprises the step of initially providing said at least one adhesive spacer as a pultruded or extruded member, wherein said at least one adhesive spacer is cut or machined from said pultruded or extruded member.

By initially providing the spacer element as a pultruded or extruded member, accordingly the cross-sectional geometry can be ensured are common across an array of different spacer elements, cut from the same member.

In one embodiment, the method comprises the steps of:
providing said first blade component as at least a portion of an upper shell of a wind turbine blade; and
providing said second blade component as at least a portion of a lower shell of a wind turbine blade,
wherein said at least one adhesive spacer element is arranged in the region of a bond line between said upper and lower shells.

By positioning an adhesive spacer between the respective bonding surfaces blade shell components, a required minimum bond line thickness can be easily maintained between the blade shells.

Preferably, said at least one adhesive element is arranged in the region of a trailing edge bond line between said upper and lower shells. Additionally or alternatively, said at least one adhesive element is arranged in the region of a leading edge bond line between said upper and lower shells.

Preferably, said at least one adhesive element is provided as a stud or pellet to ensure a minimum distance between respective bonding surfaces of said upper and lower blade shells.

Preferably, said at least one adhesive element is provided as a substantially spherical element. Preferably, the diameter of the substantially spherical element is selected to correspond to the desired minimum bond line height.

The use of a spherical spacer allows for the spacer to be easily positioned without requiring accurate alignment or placement.

There is further provided at least one adhesive spacer element for use in the method as described above.

There is further provided at least a portion of a wind turbine blade manufactured according to any aspect of the method described above.

In addition, there is also provided a wind turbine comprising at least one wind turbine blade wherein at least a portion of the wind turbine blade is manufactured according to any aspect of the method described above.

DESCRIPTION OF THE INVENTION

Embodiments of the invention will now be described, by way of example only, with reference to the accompanying drawings, in which.

It will be understood that elements common to the different embodiments of the invention have been provided with the same reference numerals in the drawings. In addition, reference numerals for some elements common to the different drawings have been omitted for some drawings, for the purposes of drawings clarity.

Figure 1:
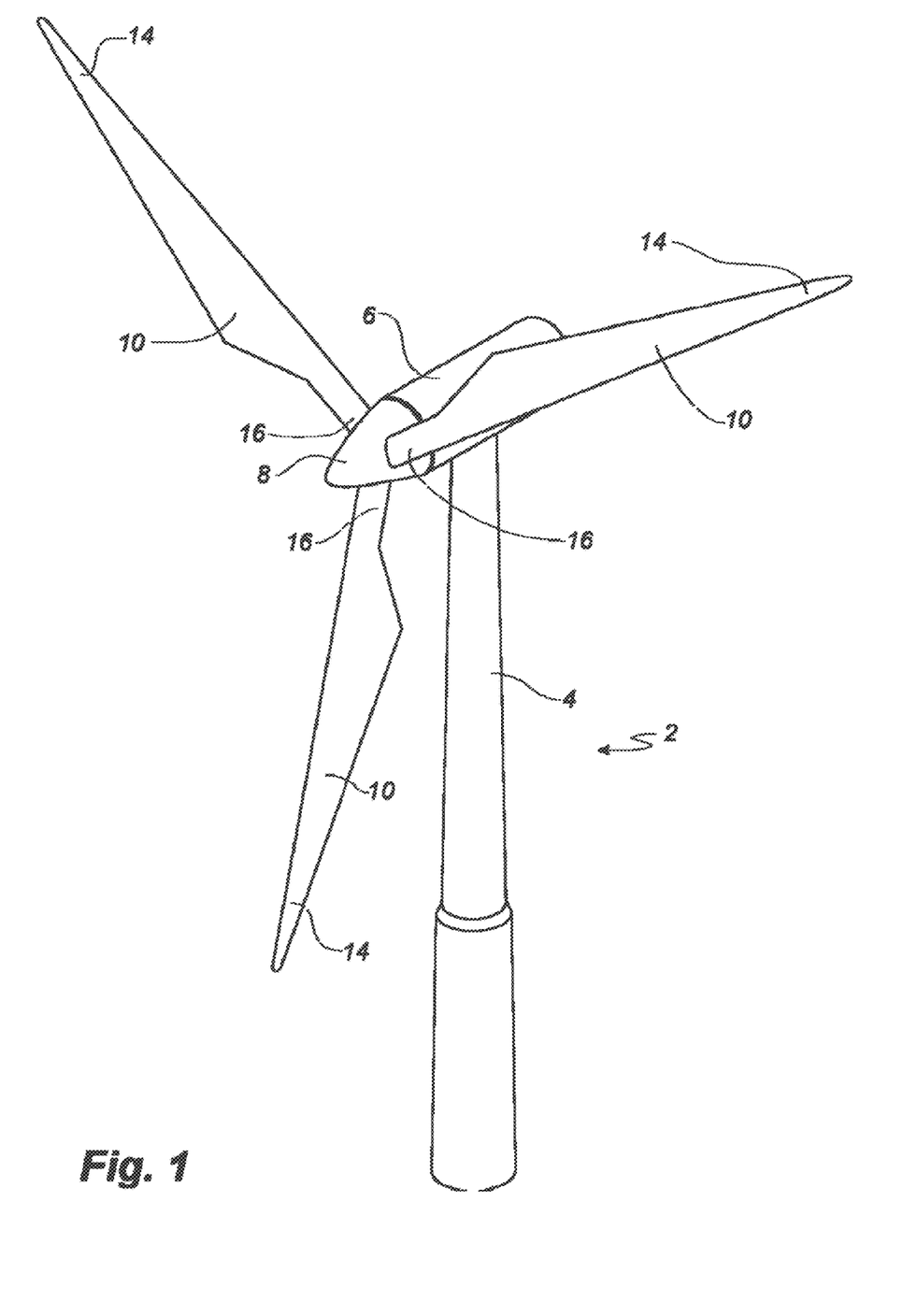
FIG. 1 shows a wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
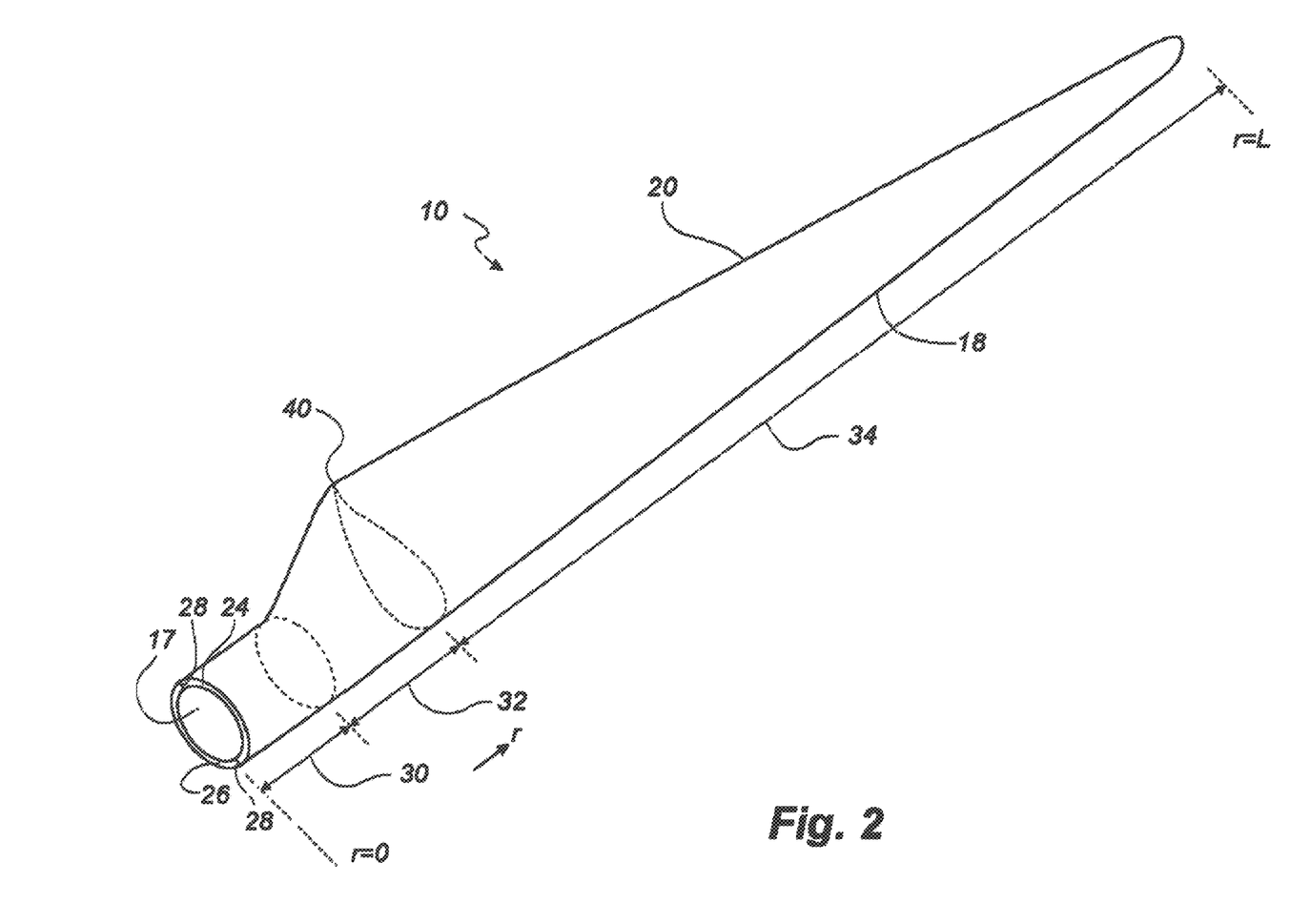
FIG. 2 shows a schematic view of a wind turbine blade according to the invention.

FIG. 2 shows a schematic view of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 3:
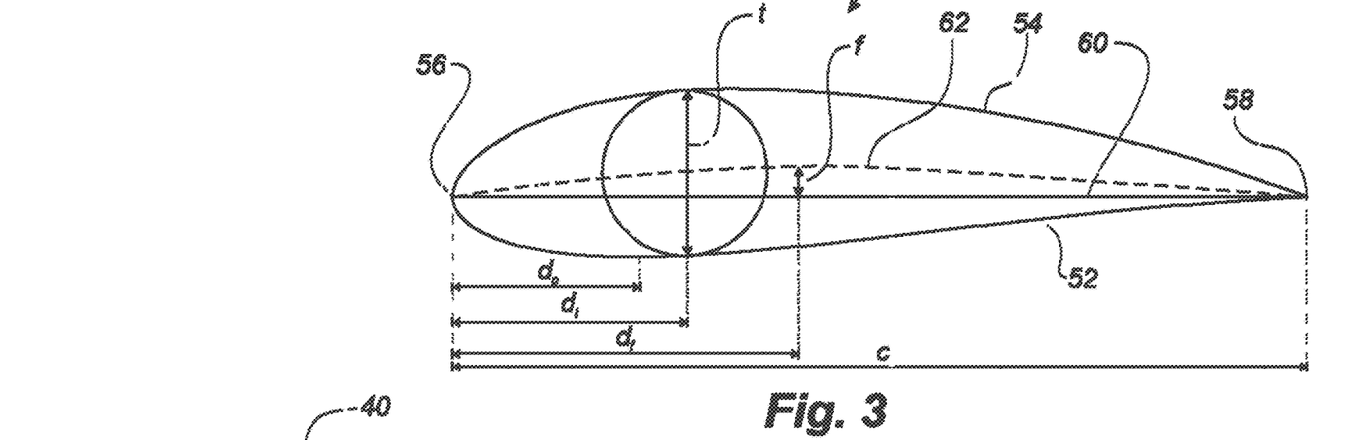
FIG. 3 shows a schematic view of an airfoil profile of the blade of FIG. 2.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

Figure 4:
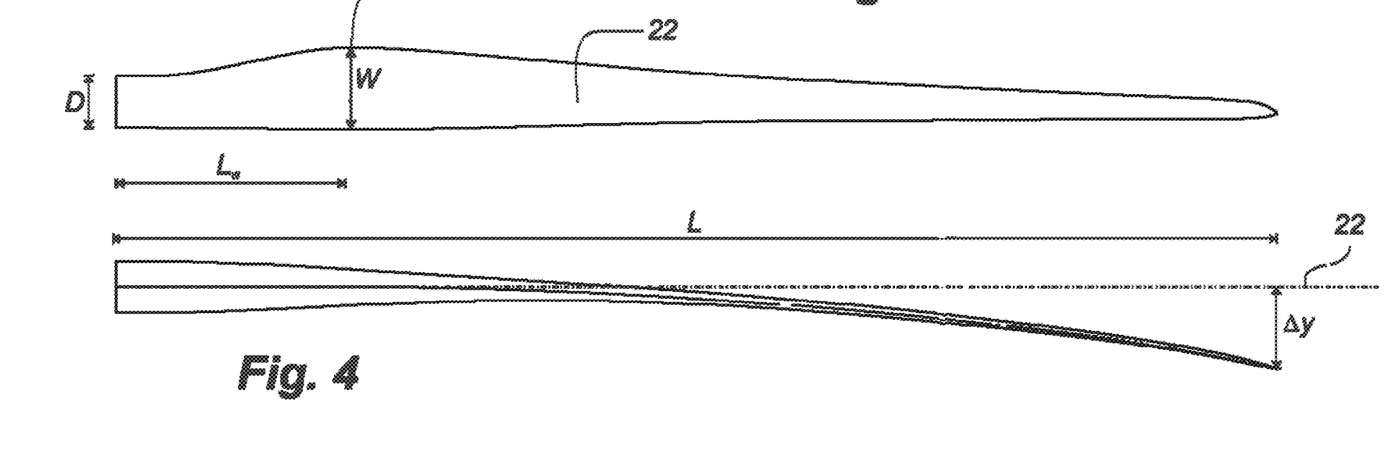
FIG. 4 shows a schematic view of the wind turbine blade of FIG. 2, seen from above and from the side.

FIG. 4 shows some other geometric parameters of the blade. The blade has a total blade length L. As shown in FIG. 2, the root end is located at position r=0, and the tip end located at r=L. The shoulder 40 of the blade is located at a position r=$L_w$, and has a shoulder width W, which equals the chord length at the shoulder 40. The diameter of the root is defined as D. Further, the blade is provided with a prebend, which is defined as Δy, which corresponds to the out of plane deflection from a pitch axis 22 of the blade.

The wind turbine blade 10 generally comprises a shell made of fibre-reinforced polymer, and is typically made as a pressure side or upwind shell part 24 and a suction side or downwind shell part 26 that are glued together along bond lines 28 extending along the trailing edge 20 and the leading edge 18 of the blade 10. The wind turbine blade may comprise internal shear webs (not shown) extending between opposed internal surfaces of the blade shell, to provide for structural rigidity and resistance to buckling.

Wind turbine blades are generally formed from fibre-reinforced plastics material, e.g. glass fibres and/or carbon fibres which are arranged in a mould and cured with a resin to form a solid structure. Modern wind turbine blades can often be in excess of or 40 meters in length, having blade root diameters of several meters. Wind turbine blades are generally designed for relatively long lifetimes and to withstand considerable structural and dynamic loading.

A first embodiment of a system and method for the manufacture of a wind turbine blade is shown in FIG. 6.

Figure 6A:
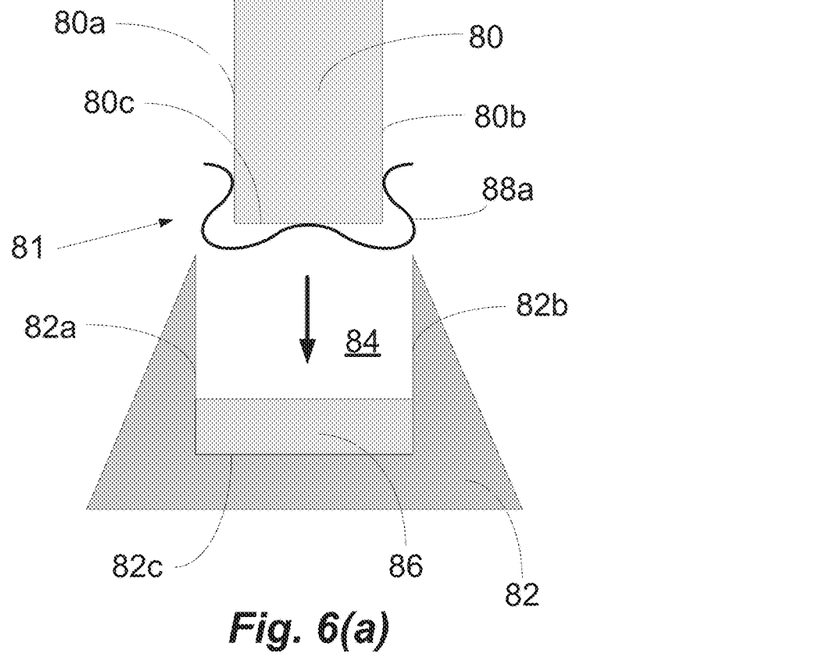
FIG. 6 illustrates a cross-sectional view of a first embodiment of a wind turbine blade component assembly method according to the invention.

With reference to the cross-sectional view of FIG. 6(*a*), a portion of a male component in the form of a shear web body 80 is arranged to be partly received within a female component in the form of a web foot 82 for a shear web. A first end 81 of the shear web body 80 is arranged to be joined to the web foot 82. The shear web body 80 comprises a panel body, for example a sandwich panel construction, having first and second opposite major surfaces 80*a*,80*b*, and a first minor surface 80*c* located at said first end 81.

The web foot 82 comprises an elongate body having female channel 84. The web foot 82 comprises a substantially U-shaped cross-sectional profile, having first and second opposed side walls 82*a*,82*b* and a base wall 82*c* defining the female channel 84 of the web foot 82.

A quantity of adhesive 86 is provided in the female channel 84 prior to the insertion of the first end 81 of the shear web body 80. Accordingly, after insertion, the quantity of adhesive 86 is squeezed about the interface between the shear web body 80 and the web foot 82 which, when cured, forms an adhesive bond between the components. Additionally or alternatively, adhesive may be supplied on at least a portion of the first end 81 of the shear web body 80, prior to insertion. Additionally or alternatively, adhesive may be supplied to the interface between the shear web body 80 and the web foot 82 after the insertion of the first end 81.

At least one adhesive spacer element 88 is provided between the first end 81 of the shear web body 80 and the walls of the female channel 84 of the web foot 82. In the embodiment of FIG. 6, the at least one adhesive spacer element 88 is provided in the form of a spacer clip 88*a* which can be attached to the first end 81 of the shear web body 80 prior to insertion into the female channel 84.

The spacer clip 88*a* comprises an undulating or corrugated profile, wherein sections of the spacer clip 88*a* are arranged to contact each of the first and second major surfaces 80*a*,80*b* and first minor surface 80*c* of the shear web body 80 when attached to said first end 81, with adjacent sections of the spacer clip projecting away from said surfaces 80*a*,80*b*,80*c*. Accordingly, when attached to the first end 81 of the shear web body 80, the spacer clip 88*a* defines a bond space adjacent the said first and second major surfaces 80*a*,80*b* and first minor surface 80*c* located at said first end 81.

Figure 6B:
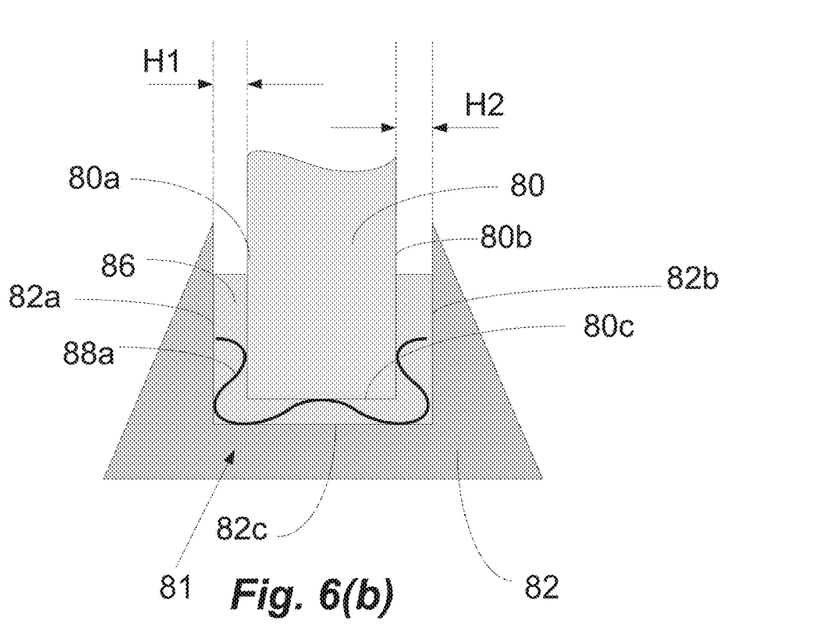

With reference to FIG. 6(*b*), after insertion of the first end 81 of the shear web body 80 into the female channel 84 of the web foot 82, the spacer clip 88*a* provides a buffer between the major and minor surfaces 80*a*,80*b*,80*c* at the first end 81 of the shear web body 80 and the respective opposed side and base walls 82*a*,82*b*,82*c* of the female channel 84. Accordingly, the spacer clip 88*a* acts to align the first end 81 of the shear web body 80 relatively centrally within the female channel 84 of the web foot 82, wherein the space between the said major and minor surfaces 80*a*,80*b*, 80*c* and the said respective opposed side and base walls 82*a*,82*b*,82*c* is defined by the profile of the spacer clip 88*a*. As a result, the adhesive 86 which is provided between the blade components is pressed into a substantially uniform adhesive height about the interface between the said first end 81 and the said female channel 84.

The spacer clip 88*a* is preferably arranged such that the bond line height H1 between the first major surface 80*a* of the shear web body 80 and the first side wall 82*a* of the female channel 84 is substantially equal to the bond line height H2 between the second major surface 80*b* of the shear web body 80 and the second side wall 82*b* of the female channel 84. The adhesive 86 is subsequently allowed to cure, to form a secure bond between the blade components.

The use of an adhesive spacer clip 88*a* between the shear web body 80 and the web foot 82 provides a relatively simple, relatively low-cost solution to ensuring accurate positioning of blade components resulting in guaranteed minimum bond line heights at the interface between components. Accordingly, components bonded together using the system of the invention have improved quality and an increased failure resistance, when compared to prior art bonding systems.

In a further advantageous aspect of the invention, the adhesive spacer element 88 may act as a spring member between different components, allowing for minor angular variations in the orientation of the shear web body 80 relative to the web foot 82. In such cases, the spacer element may act to adjust the orientation of the female channel 84 to match the orientation of the first end 81 of the shear web body 80, and/or the spacer element may act to return the shear web body 80 to a regular alignment with the female channel 84.

Figure 7:
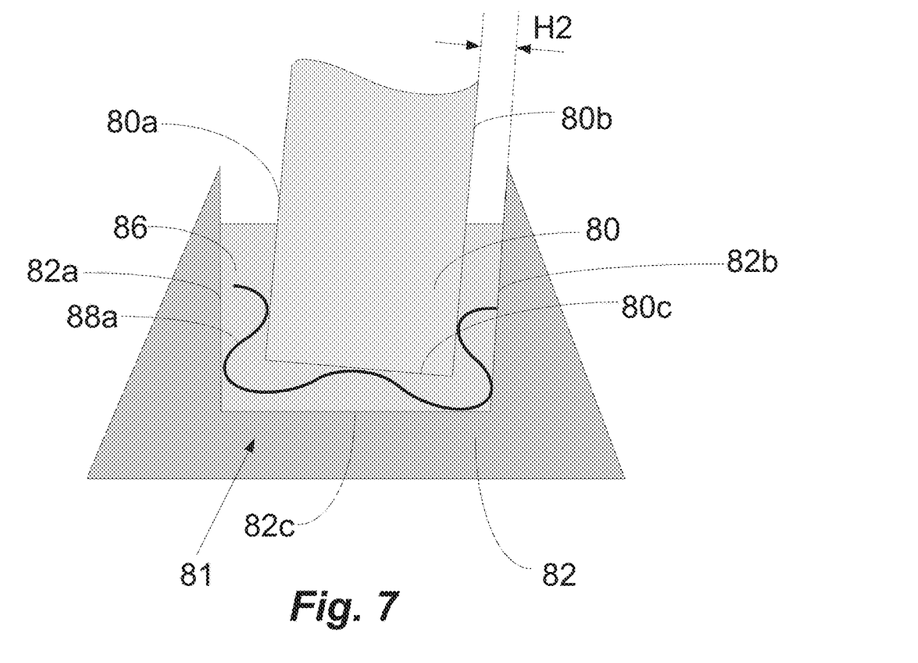
FIG. 7 illustrates a cross-sectional view of the embodiment of FIG. 6, having a change in relative angles between blade components.

With reference to FIG. 7, the shear web body 80 may be inserted into the female channel 84 at a non-orthogonal angle to the channel 84 orientation. Accordingly, the adhesive spacer clip 88*a* acts to ensure that a buffer zone is preserved around the first end 81 of the web body 80, by widening the female channel 84 in the direction of inclination of the shear web body 80. In FIG. 7, this is shown by the adhesive spacer clip 88*a* acting on the second side wall 82*b* of the channel 84. By widening the female channel 84 in such a manner, the minimum adhesive bond line height H2 is preserved between the second major surface 80*b* and the second side wall 82*b*, while the bond line height in the other sections of the component interface at the first end 81, i.e. between the first major surface 80*a* and the first side wall 82*a*, and between the minor surface 80*c* and the base wall 82*c*, is effectively guaranteed to be at least the minimum bond line height.

While the embodiment of FIGS. 6 and 7 shows a spacer clip 88*a* provided as an undulating or corrugated member for attachment to an end of a shear web body, it will be understood that the adhesive spacer 88 of the invention may be provided in any suitable shape or configuration.

Figure 8:
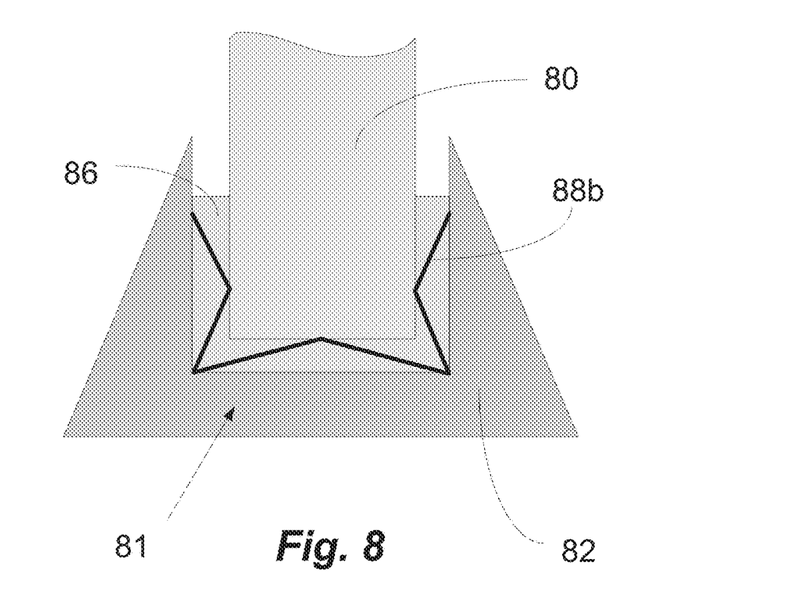
FIG. 8 illustrates a second embodiment of a wind turbine blade component assembly method according to the invention.

With reference to FIG. 8, the at least one adhesive spacer element 88 is provided in the form of an angled spacer clip 88*b*. Such an angled spacer clip 88*b* may be formed as a collapsed concertina-like member, which is arranged to be opened to receive the first end 81 of the shear web body 80, wherein the folds of the concertina-like member are adapted to contact portions of the said major and minor surfaces 80*a*,80*b*,80*c* and opposed said side and base walls 82*a*,82*b*, 82*c*. The angled spacer clip 88*b* is formed to have a resilience to ensure that the first end 81 of the shear web body 80 is substantially centrally aligned within the female channel 84 of the web foot 82.

Figure 9A:
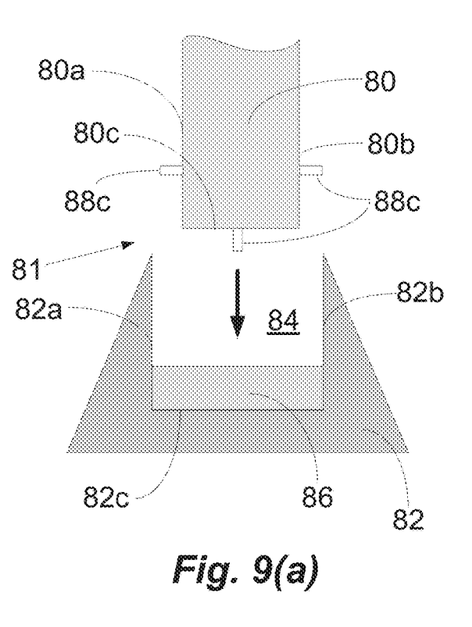
FIG. 9 illustrates a cross-sectional view of a third embodiment of a wind turbine blade component assembly method according to the invention.
Figure 9B:
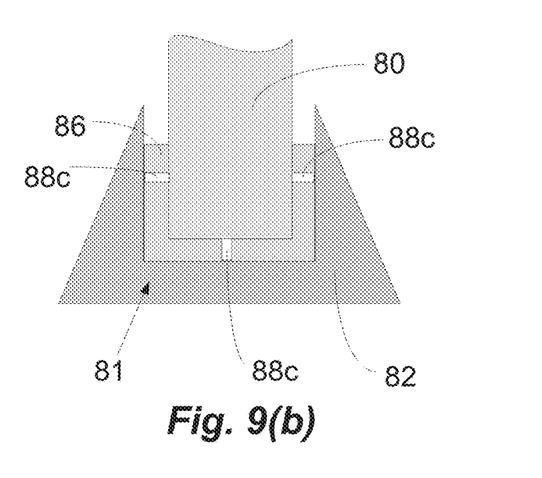

With reference to FIG. 9, the at least one adhesive spacer element 88 is provided in the form of a plurality of stud members 88*c* which are arranged about the interface between the blade components. In the example shown in FIG. 9, at least one stud member 88*c* is positioned adjacent each of the major and minor surfaces 80*a*,80*b*,80*c* at the first end 81 of the shear web body 80, FIG. 9(*a*). Accordingly, after insertion of the first end 81 of the shear web body 80 into the female channel 84, FIG. 9(*b*), the stud members 88*c* are positioned between the major and minor surfaces 80*a*, 80*b*,80*c* at the first end 81 of the shear web body 80 and the respective opposed side and base walls 82*a*,82*b*,82*c* of the female channel 84, thereby presenting a buffer zone about the interface between the blade components to ensure a desired bond line height for the adhesive located between the components.

The stud members 88*c* may be provided in any suitable shape, e.g. cuboid, cylindrical, spherical, wherein the dimensions of the members 88*c* are selected to define an adequate bond line height between blade components. It will be understood that the stud members 88*c* may be attached to the first end 81 of the shear web body 80 using any suitable method, e.g. adhesive bonding, bolting, screwing, or the members 88*c* may be formed integrally with the shear web body 80.

Figure 10:
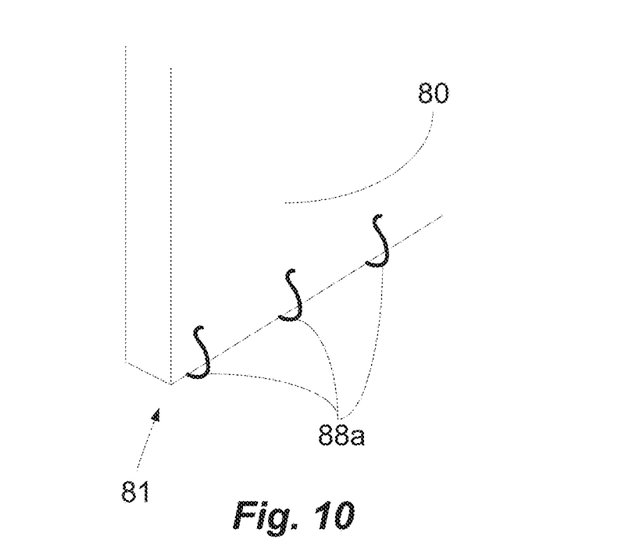
FIG. 10 illustrates an isometric perspective view of a portion of the method of FIG. 6.

It will be understood that the adhesive spacer elements 88*a*,88*b*,88*c* are preferably non-continuous along the longitudinal direction of the blade components. For example, with reference to FIG. 10, the adhesive spacer elements 88*a* are shown provided as an array of adhesive spacers located at positions spaced along the length of the shear web body 82. Preferably, the adhesive spacer elements 88*a*,88*b*,88*c* can be provided as an array of adhesive spacers spaced approximately 0.5-1 m apart, substantially along the length of the respective bonding surfaces of the blade components to be joined together.

While the embodiments above show the at least one adhesive spacer element 88 being attached to the shear web body 80 prior to insertion into the female channel 84 of the web foot 82, it will be understood that in an alternative configuration, the at least one adhesive spacer element 88 may be positioned in the female channel 84 prior to the insertion of the first end 81 of the shear web body 80

While the embodiments illustrated show an assembly method for a portion of a shear web for a wind turbine blade, in particular for a first end of the shear web, it will be further understood that the assembly method may be mirrored for the opposite end of the shear web.

In addition, while the above embodiments illustrate the attachment of a shear web body 80 to a web foot 82 to form a portion of a shear web for a wind turbine blade 10, it will be understood that the invention is particularly suitable for use to ensure a minimum bond line height at the interface between any male-female coupling connection in a wind turbine blade.

The adhesive spacer element 88*a*,88*b*,88*c* is preferably formed from a relatively resilient material. The spacer element may be initially formed as a pultruded member having a cross-sectional profile according to the desired shape of the spacer element, wherein individual spacer elements may be cut or machined from the pultruded member.

While the above embodiments describe the use of the adhesive spacer element 88 in the context of a male-female connection between wind turbine blade components, it will be understood that the invention may equally apply to any adhesive connection between components of a wind turbine blade 10, to ensure a desired minimum bond line height between components.

Figure 11:
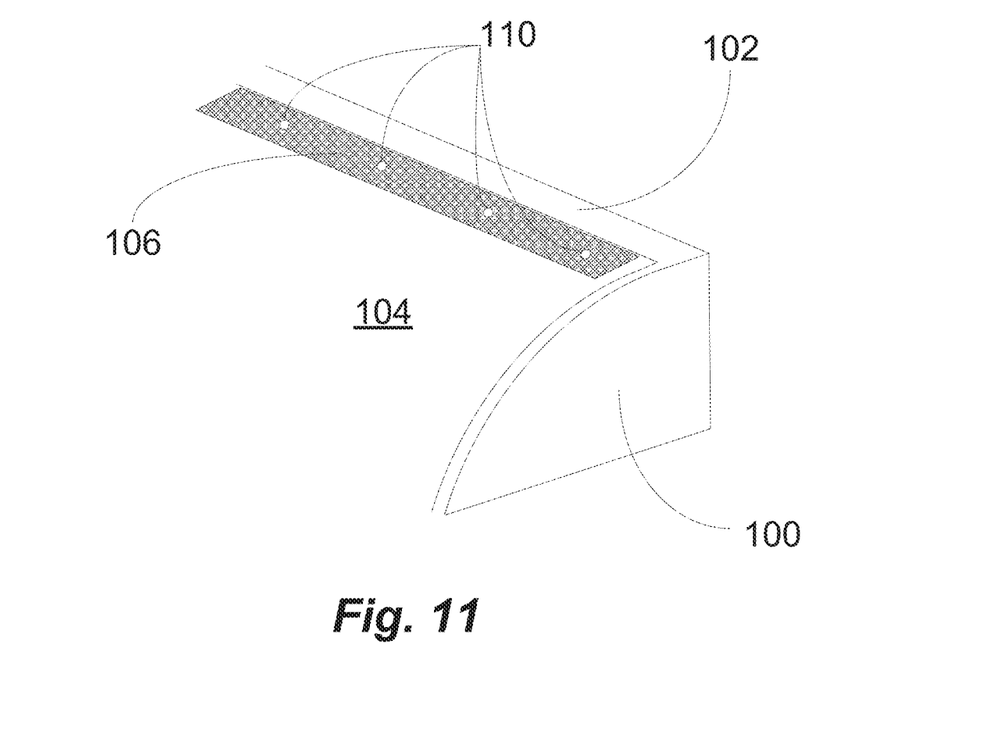
FIG. 11 illustrates an isometric perspective view of a fourth embodiment of a wind turbine blade component assembly method according to the invention.
Figure 12:
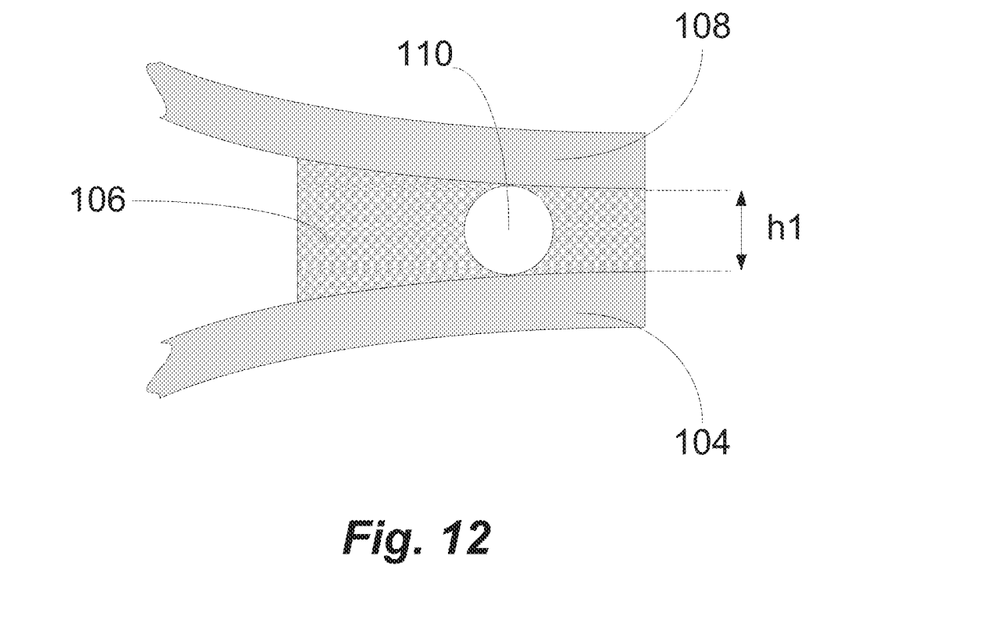
FIG. 12 illustrates a cross-sectional view of a portion of the method of FIG. 11.

With reference to FIG. 11, an enlarged view of a partial section of a wind turbine blade manufacturing apparatus is shown. The apparatus comprises a blade shell mould 100 which presents a mould surface 102 to define the desired geometry of a wind turbine blade shell. A plurality of layers of fibre material are laid up on the mould surface 102 and infused with a resin, where the resin is cured to form a fibre composite wind turbine blade shell 104. In FIG. 11, a portion of the trailing edge side 104*a* of the blade shell 104 is shown. An adhesive layer 106 is applied along the edges of the blade shell 104, wherein the adhesive layer 106 is used to bond the first blade shell 104 to a corresponding second blade shell 108 (FIG. 12). The second blade shell 108 may be formed in a corresponding second blade shell mould (not shown), wherein the first and second blade shells are subsequently closed and bonded together to form a wind turbine blade.

Prior to the steps of closing and bonding blade shells, a plurality of adhesive spacers 110 are arranged at least partially in or on top of the adhesive layer 106 on the first blade shell 104.

With reference to FIG. 12, as the blade shells 104,108 are closed and pressed together, the adhesive spacers 110 act to define an adhesive buffer height between the opposed surfaces of the shells 104,108. Accordingly, the height of the adhesive bond line 106 between the shells 104,108 is maintained at a minimum height h1, substantially corresponding to the diameter of the adhesive spacers 110. As a result, an accurately defined bond line height between blade shell sections can be effectively guaranteed, providing for greater quality control for wind turbine blade adhesive bonds.

Preferably, the adhesive spacers 110 comprise substantially spherical elements having a diameter substantially equivalent to a desired minimum bond line height between blade shells. As the spacers are provided as spheres, accordingly the initial orientation of the spacers in or on the adhesive layer 106 does not require accurate placement. In addition, the spacers may be positioned on top of the adhesive layer, such that the action of closing the blade shells presses the spacers into the relatively viscous adhesive layer without resulting in a misalignment or misplacement of the spacers. However, it will be understood that the adhesive spacers may comprise any suitable shape, e.g. cylindrical, cuboid, etc. In an alternative aspect, the adhesive spacers may comprise a corrugated or concertina-like member, which can be positioned between the blade shells to ensure a minimum bond line height. In addition, as with the embodiments of FIGS. 6-9, the adhesive spacers 110 are provided as an array of adhesive spacers, spaced approximately 0.5-1 m apart along the length of the bond line between blade shells.

The embodiment of FIGS. 11 and 12 shows a trailing edge bond line between blade shells, but it will be understood that the invention may also be used for a leading edge bond line between blade shells. In addition, while the embodiment of FIGS. 11 and 12 is shown in the context of a bond line arranged between wind turbine blade shell sections, it will be understood that the system and method of the invention may be used for any adhesive bond line between components of a wind turbine blade.

In one aspect of the invention, the manufacturing apparatus may be provided wherein a supply of adhesive spacer elements, preferably in the form of a reservoir of spheres or balls, is coupled to an adhesive dispenser. As adhesive is applied to a blade component, e.g. along a blade shell trailing edge or leading edge bond line, individual adhesive spacer elements may be dispensed into the adhesive supply. For example, the adhesive spacer elements may be dispensed based on the quantity or volume of adhesive dispensed, and/or on the distance travelled by the adhesive dispenser. In one example, for every 2 kg of adhesive applied to a bond line a spacer sphere or ball is released into the adhesive flow applied to the bond line. Accordingly, the dispensing of the spacer elements may be relatively easily incorporated into the manufacturing process.

It will be understood that the shape and dimensions of the spacer element 88a,88b,88c,110 may be selected to ensure that a minimum bond line height is maintained between components. Preferably, the minimum height is selected to be between approximately 1-15 mm, further preferably between approximately 1-5 mm. In one preferred aspect, the adhesive spacers may be provided as balls or spheres having a diameter of approximately 3 mm.

The spacer elements 88a,88b,88c,110 may be provided from any suitable material, e.g. polyurethane, polyester, vinyl ester, etc. The spacer elements 88a,88b,88c,110 may be provided as a relatively resilient material, e.g. a rubber or plastics material. The spacer elements 88a,88b,88c,110 may be provided as a resilient porous material, e.g. balsa, cork, etc.

The use of the adhesive spacer elements according to the invention acts to define a buffer zone or space between the bonding surfaces of the respective blade components, such that the adhesive bond line height between blade components can be effectively guaranteed without the need for accurate alignment and positioning techniques.

The invention is not limited to the embodiments described herein, and may be modified or adapted without departing from the scope of the present invention.

The invention claimed is:

1. A method for manufacturing at least a portion of a wind turbine blade, the method comprising the steps of:
providing a first blade component;
providing a second blade component, wherein a portion of said first blade component is received within a portion of said second blade component; and
bonding said first component to said second component via an adhesive bond line applied between a bonding surface of said first component and a bonding surface of said second component,
wherein the method further comprises the step of, prior to said step of bonding, arranging at least one adhesive spacer element between the respective bonding surfaces of said first and second components, said at least one adhesive spacer element integrated with the adhesive bond line after said bonding, wherein said at least one adhesive spacer element ensures a minimum height of the adhesive bond line is maintained between the respective bonding surfaces of said first and second components, wherein said at least one adhesive spacer element comprises a spacer clip adapted to be fitted over the portion of said first blade component received within the portion of said second blade component.

2. The method of claim 1, wherein said at least one adhesive spacer is arranged such that the minimum height of the adhesive bond line is ensured for substantially the entire portion of said first blade component received in said second blade component.

3. The method of claim 1, wherein the method comprises the steps of:
providing said first blade component as at least a portion of an upper shell of a wind turbine blade; and
providing said second blade component as at least a portion of a lower shell of the wind turbine blade,
wherein said at least one adhesive spacer element is arranged in a region of a bond line between said upper and lower shells.

4. The method of claim 3, wherein said at least one adhesive element is arranged in a region of a leading edge and/or a trailing edge bond line between said upper and lower shells.

5. The method of claim 1, wherein the at least one adhesive spacer element is arranged at least partially on top of an adhesive layer applied to at least one of the respective bonding surfaces of said first and second components.

6. The method of claim 1, wherein said at least one adhesive spacer element is provided as a substantially spherical element.

7. The method of claim 1, wherein the minimum height of the adhesive bond line is selected to be between 1-15 mm.

8. The method of claim 7, wherein the minimum height of the adhesive bond line is selected to be between 1-5 mm.

9. The method of claim 1, wherein the method comprises arranging an array of adhesive spacers spaced along a length of the respective bonding surfaces of said first and second components.

10. The method of claim 9, wherein said array of adhesive spacers are spaced approximately 0.5-1 m apart, substantially along the length of the respective bonding surfaces of said first and second components.

11. The method of claim 1, wherein said spacer clip has a U-shaped contour.

12. A method for manufacturing at least a portion of a wind turbine blade, the method comprising the steps of:
providing a first blade component, wherein said first blade component is selected from the group consisting of a sandwich panel and a shear web body;
providing a second blade component, wherein said second blade component comprises a web foot flange arranged to receive an end of said first blade component; and
bonding said first component to said second component via an adhesive bond line applied between a bonding surface of said first component and a bonding surface of said second component,
wherein the method further comprises the step of, prior to said step of bonding, arranging at least one adhesive spacer element between the respective bonding surfaces of said first and second components, said at least one adhesive spacer element integrated with the adhesive bond line after said bonding, wherein said at least one adhesive spacer element ensures a minimum height of the adhesive bond line is maintained between the respective bonding surfaces of said first and second components, wherein said at least one adhesive spacer element comprises a spacer clip adapted to be fitted over an end of said first blade component.

* * * * *